United States Patent [19]

Sotoyama et al.

[11] Patent Number: 4,618,041
[45] Date of Patent: Oct. 21, 1986

[54] LOCK-UP CONTROL SYSTEM FOR A TORQUE CONVERTER FOR AN AUTOMATIC TRANSMISSION

[75] Inventors: Kaoru Sotoyama; Shizuo Sumida; Toshiyuki Kikuchi, all of Hiroshima, Japan

[73] Assignee: Mazda Motor Corporation, Japan

[21] Appl. No.: 613,611

[22] Filed: May 24, 1984

[30] Foreign Application Priority Data

May 27, 1983 [JP] Japan .................................. 58-93423

[51] Int. Cl.$^4$ ............................................ B60K 41/28
[52] U.S. Cl. .............................. 192/0.044; 192/0.052; 192/0.076; 192/0.09; 74/731
[58] Field of Search .................. 192/0.09, 0.052, 0.076, 192/0.044, 3.31, 3.58, 103 R; 74/863, 864, 865, 866, 867, 868, 869, 731, 732; 364/424.1

[56] References Cited

U.S. PATENT DOCUMENTS

| | | | |
|---|---|---|---|
| 4,386,521 | 6/1983 | Hamada et al. | 192/3.31 X |
| 4,393,467 | 6/1983 | Miki et al. | 364/424.1 |
| 4,431,095 | 2/1984 | Suga | 192/3.31 |
| 4,457,410 | 7/1984 | Suga et al. | 74/731 X |
| 4,516,671 | 5/1985 | Nishikawa et al. | 192/0.076 |

*Primary Examiner*—George H. Krizmanich

*Attorney, Agent, or Firm*—Gerald J. Ferguson, Jr.; James E. Bryan; Michael P. Hoffman

[57] ABSTRACT

A lock-up mechanism for a torque converter for an automatic transmission is arranged to be selectively engaged to directly connect the output shaft and the input shaft of the torque converter when the operating condition of the engine is in a lock-up zone. The operating condition of the engine is represented by a rotational speed signal representing the rpm of the input shaft or the output shaft of the torque converter, and an engine load signal, and the lock-up zone is defined by first to third relations, the first relation being preset from a relation which the rotational speed and the engine load are to have with each other when the torque ratio of the engine output torque to the torque converter output torque can be considered to be 1, the second relation being preset from a relation which the rotational speed and the engine load are to have with each other when the engine output may be considered to be zero, and the third relation being preset from a lower limit of the rotational speed at which lock-up can be permitted without possibility of engine stall. The lower limit is shifted toward the lower speed side of the rotational speed as the transmission stage of the transmission gear mechanism is shifted toward the higher speed stage, and the third relation is changed corresponding to the change in the lower limit of the rotational speed.

9 Claims, 22 Drawing Figures

PRIOR ART

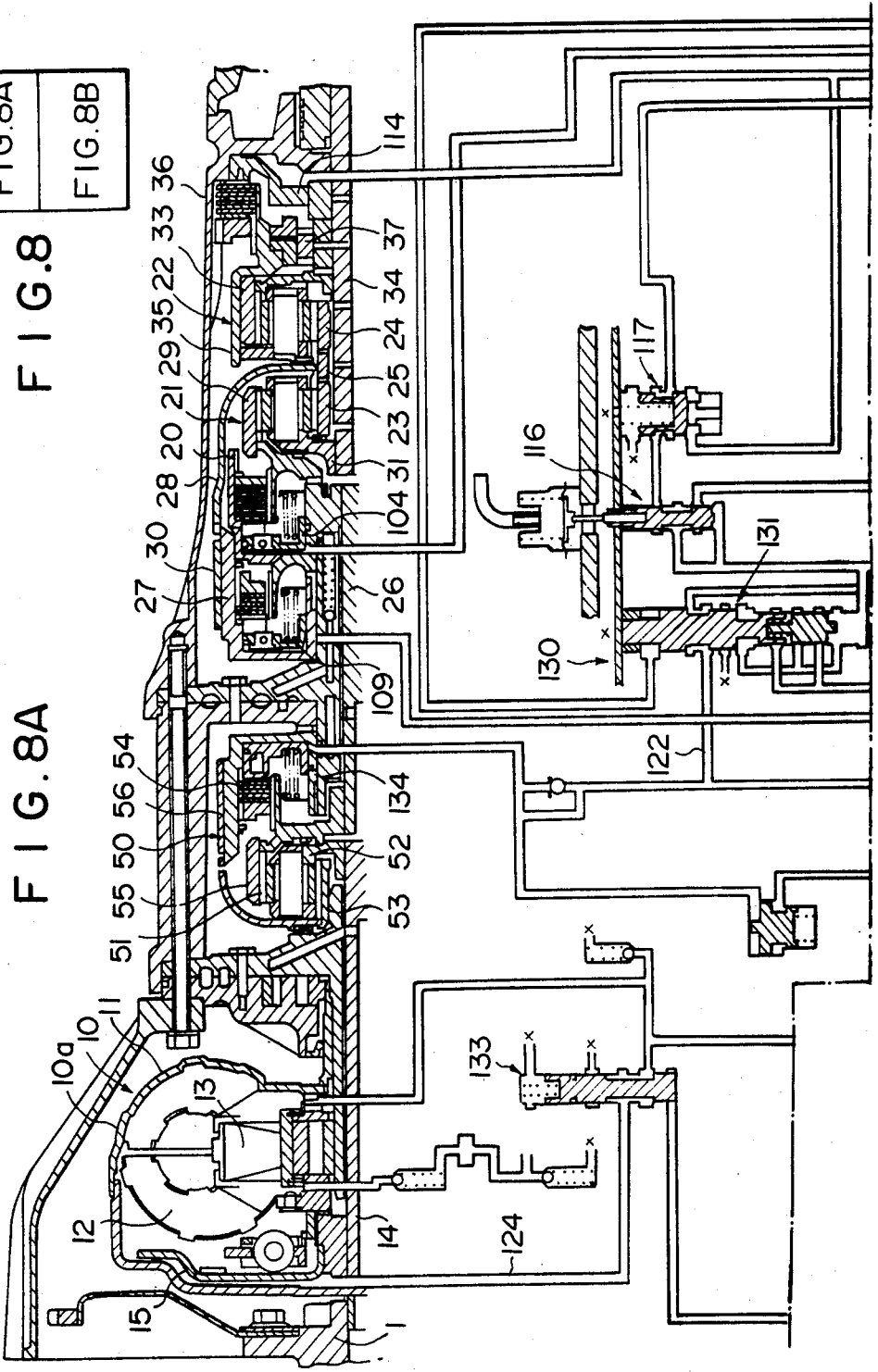

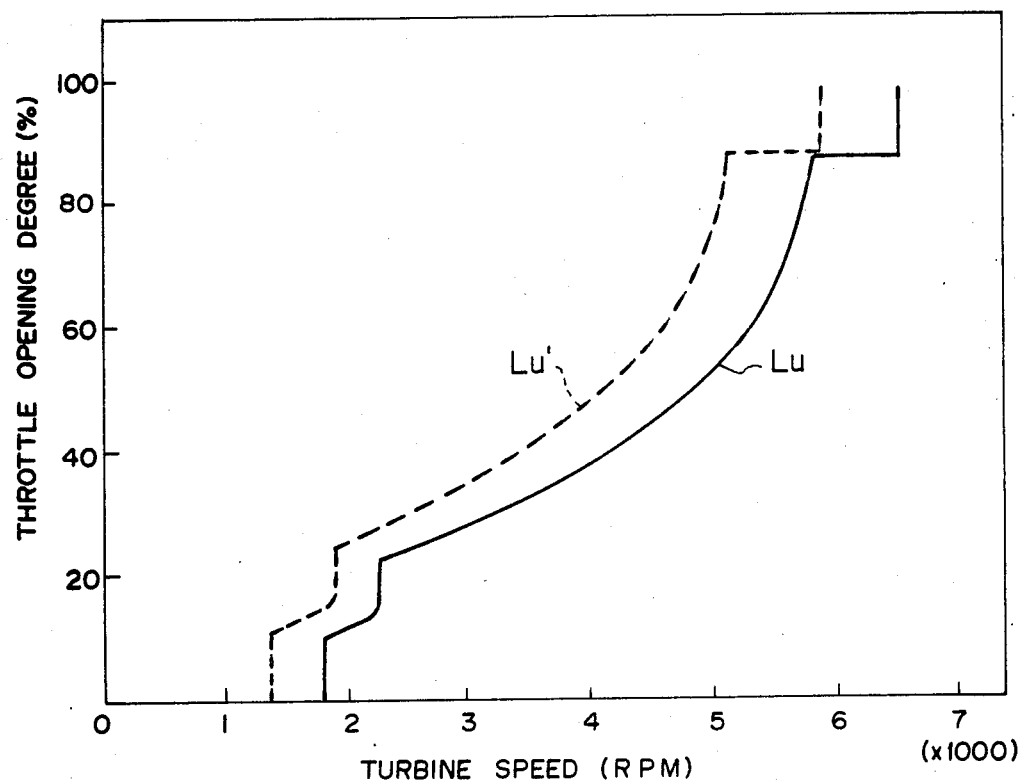
F I G. 12

LOCK-UP CONTROL SYSTEM FOR A TORQUE CONVERTER FOR AN AUTOMATIC TRANSMISSION

BACKGROUND OF THE INVENTION

1. Field of the Invention

This invention generally relates to a lock-up control system for a torque converter for an automatic transmission.

2. Description of the Prior Art

A torque converter generally includes a pump impeller connected with an engine output shaft to be driven thereby, a turbine runner having an output member and a stator disposed between the pump impeller and the turbine runner, so that hydraulic fluid is circulated by the engine driven pump impeller through the turbine runner with the aid of the stator which functions to deflect the hydraulic fluid from the turbine runner in a direction in which the fluid flow does not disturb the toration of the pump impeller when the hydraulic fluid flows into the pump impeller. With the circulation of the hydraulic fluid in this way, the turbine runner is subjected to a hydrodynamic force to be driven thereby. The torque converter has an automatic speed changing function wherein the torque is amplified when the speed of the turbine runner is lower than that of the pump impeller and the output torque gradually decreases as the speed of the turbine runner approaches to that of the pump impeller. However, the torque converter is disadvantageous in that it inherently has slippage between the pump impeller and the turbine runner which causes a decrease in transmission efficiency and poor fuel economy.

It has therefore been proposed to provide a lock-up clutch mechanism between the input and output shafts of the torque converter and have the lock-up clutch engaged when the turbine runner speed is close to the pump impeller speed so that the turbine runner is rotated as a unit with the pump impeller. For example, in Japanese Unexamined Patent Publication No. 56(1981)-138559, there is disclosed a torque converter lock-up control system which has a memory map provided with a lock-up control line defining a lock-up zone and a lock-up release zone as a function of the vehicle speed and the engine load. That is, in the lock-up control system, whether or not the operating condition is in the lock-up zone is determined from the engine speed represented by a signal from a vehicle speed detector which detects the vehicle speed from the rpm of the output shaft of the transmission and the engine load represented by a signal from an engine load detector which detects the engine load from the negative pressure in the intake passage. When the point having detected values of the vehicle speed and the engine load as its ordered pair (on a coordinate plane the abscissa and the ordinate of which respectively represent the vehicle speed and the engine load) falls in the lock-up zone on the higher vehicle speed side of said lock-up control line, the lock-up mechanism is actuated to effect lock-up, while when the point falls on the other side of the lock-up control line, the operation of the lock-up mechanism is interrupted to release the lock-up.

This lock-up control system is considered to be advantageous in that the torque converter lock-up is automatically controlled in a preferable manner according to the operating condition of the engine, thereby obtaining improved fuel economy. However, it should be noted that in the lock-up control system, there is a possibility that the lock-up mechanism may be engaged even when the throttle valve is fully closed if the operating condition of the engine is in the lock-up zone. This causes instable operation of the engine since the engine output torque may fluctuate when the throttle valve is fully closed so that vibration or instable engine operation may be produced if the torque converter is locked up.

In Japanese Unexamined Patent Publication No. 56(1981)-39353, there is disclosed a lock-up control system for a torque converter in which the lock-up mechanism is released near or at the full close position of the throttle valve irrespective of the relationship between the operating condition of the engine and the lock-up control line. However, this system is not satisfactory in the following three respects.

First respect

Firstly, it should be pointed out that the system is still disadvantageous in respect of fuel economy. FIG. 1 shows the relationship between the engine rpm and the opening degree of the throttle valve with the torque of the output shaft of the engine being fixed at various values from 0 to 14.5 Kg·m when the engine is operated without load. As can be understood from FIG. 1, the engine rpm-throttle opening degree characteristic curve when the engine output shaft torque is zero is a line which rises from left to right. That is, the engine rpm increases with increase in the opening degree of the throttle valve. In FIG. 2A, the dotted lines show engine rpm-engine output torque characteristic curves when the opening degree of the throttle valve is fixed at various values from 10° to full open, while the solid lines show engine rpm-engine output torque characteristic curves when the fuel consumption ratio is fixed at various values from 2 to 12 l/h. As can be understood from FIG. 2A, as the engine rpm becomes low, a given output torque can be obtained with less fuel consumption. FIG. 2B shows the engine rpm-fuel flow characteristic curve when the engine output torque is zero.

In FIG. 3, the dotted lines show the relationship between the turbine rpm and the engine rpm (turbine speed-engine speed characteristic curves) when the opening degree of the throttle valve is fixed at 0/8 (full close), ⅛, ⅜ and 8/8 (full open) with the torque converter connected to the engine output shaft, while the solid lines show the relationship between the turbine rpm and the torque of the turbine output shaft (turbine speed-turbine output torque characteristic curves) when the opening degree of the throttle valve is fixed at 0/8, ⅛, 2/8, ⅜, 4/8, ⅝, 6/8, 7/8 and 8/8 with the torque converter connected to the engine output shaft.

FIG. 4 shows the relationship between the turbine rpm and the opening degree of the throttle valve with the torque of the output shaft of the turbine being fixed at various values from 0 to 18 Kg·m. As can be from FIG. 4, the turbine rpm-throttle opening degree characteristics is similar to the engine rpm-throttle opening degree characteristics shown in FIG. 1.

In FIG. 5, the lines respectively indicated at L2000 and L4000 show the relationship between the engine rpm and the opening degree of the throttle valve when the turbine rpm is fixed at 2000 rpm and 4000 rpm, and the line indicated at L0 shows the relationship between the turbine rpm and the opening degree of the throttle valve when the output torque of the turbine is zero.

Upon analyzing the engine rpm-throttle opening degree characteristics when the turbine speed is 2000 rpm with reference to the line L2000, it is understood that when the opening degree of the throttle valve is changed between 0% and 100% with the turbine speed fixed at 2000 rpm, the engine speed changes between 1700 rpm and 2700 rpm, becoming equal to the turbine rpm of 2000 rpm when the opening degree of the throttle valve is about 8% (about 7°2′), being higher than the turbine rpm when the opening degree of the throttle valve is larger than 8%, and being lower than the turbine rpm when the opening degree of the throttle valve is smaller than 8%. An opening degree of the throttle valve of about 8% corresponds to the point at which the output torque of the turbine output shaft becomes zero.

Considering the lock-up control characteristics of the relevant lock-up control system taking into account the characteristics of the engine and the torque converter described above, it is seen that since the lock-up is not released until the opening degree of the throttle valve is reduced to or near zero in the lock-up control system, the lock-up mechanism is kept engaged even when the opening degree of the throttle valve is reduced below the line L0 (FIG. 5) representing the turbine rpm-throttle opening degree characteristics when the torque of the turbine output is zero. For example, in the case that the turbine speed is 2000 rpm, the lock-up mechanism is kept engaged even when the opening degree of the throttle valve is reduced below 8%. Accordingly, the engine rpm is increased to the turbine rpm by way of the lock-up when the engine speed should be lower than the turbine speed. In other words, the engine is rotated at unnecessarily high speed driven by the turbine runner. This means that an unnecessarily large amount of fuel is drawn into the engine as can be understood from FIG. 2B.

Second respect

A substantial torque shock is produced when the throttle valve is closed and the lock-up mechanism is disengaged. That is, after the opening degree of the throttle valve is reduced below the line L0 and before the lock-up mechanism is released, the engine is driven by the turbine as described above. This means that the engine is a load on the turbine in such an operating condition. When the opening degree of the throttle valve is further reduced and the lock-up mechanism is released or disengaged, the turbine is subjected to an abrupt change in load, whereby a large torque shock is produced.

Third respect

Finally, when the vehicle is driven downhill, the engine-brake effect does not correspond to the opening degree of the accelerator or the throttle valve, and there is caused an abrupt change in the engine-brake effect when the throttle valve is closed and the lock-up mechanism is released. Similar abrupt change will be experienced when the throttle valve is gradually opened and the lock-up mechanism is engaged. FIG. 6A is a graph showing change in driving force when the opening degree of the accelerator is gradually reduced in the known system. When the opening degree of the accelerator is reduced in an operating condition in which the driving force is zero, the driving force changes as shown by the dotted line in FIG. 6A if the lock-up mechanism is not engaged, while if the lock-up mechanism is engaged, the driving force is positively lowered to be less than the same when the lock-up mechanism is not engaged as shown by the solid line in FIG. 6A. Therefore, when the accelerator is full closed and the lock-up mechanism is disengaged, the driving force is abruptly increased to the value which is to be taken when the lock-up mechanism is not engaged, whereby a torque shock is produced.

As will be apparent from the description above, when the accelerator is gradually opened from the full closed position, the driving force is abruptly lowered at the beginning of operation of the lock-up mechanism, thereby producing a torque shock.

In view of the three drawbacks described above, there has been proposed a lock-up control system in which lock-up is released on the zero engine output line. In this system, the lock-up zone is defined as the zone surrounded by first to third lock-up control lines h1 to h3 (hatched portion in FIG. 6B) in a coordinate plane the abscissa and the ordinate of which respectively represent the opening degree of the throttle valve and the turbine rpm, the first lock-up control line h1 corresponding to the line on which the torque ratio of the torque converter, i.e., the ratio of the input torque to the output torque of the torque converter, can be considered to be about 1, the second lock-up control line h2 corresponding to the line on which the engine output may be considered to be zero, and the third lock-up control line h3 indicating the lower limit of the engine rpm at which lock-up can be permitted without possibility of engine stall. In the region on the right hand side of the first lock-up control line h1, i.e., when the actual turbine rpm is higher than the value on the line h1 corresponding to the actual opening degree of the throttle valve, the output torque of the torque converter becomes smaller than the engine output torque and accordingly the torque-converting function is not required. Therefore, in the region on the right hand side of the first lock-up control line h1, the lock-up is engaged to directly transmit the engine output to the transmission in order to minimize power loss through the torque converter, thereby improving fuel economy. In the region on the lower side of the second lock-up control line h2, i.e., when the actual opening degree of the throttle valve is smaller than the value on the line h2 corresponding to the actual turbine rpm, the lock-up is released since, in this region, the engine is driven to increase the fuel consumption by the turbine if the lock-up is kept engaged as described above. The third lock-up control line h3 is set to release the lock-up when the turbine rpm is reduced below a predetermined value and to keep the engine rpm higher than a predetermined value irrespective of reduction of the turbine rpm by virtue of the torque converter, thereby preventing stall of the engine. From the viewpoint of fuel consumption, it is preferred that the third lock-up control line h3 be positioned as far left as possible, i.e., that the line h3 be positioned on as far as possible toward the lower-rpm side, in order to enlarge the lock-up zone in which transmission efficiency can be improved. However, when the third lock-up control line h3 is set so that said predetermined value determined thereby corresponds to the lower limit above which stall of the engine is prevented in the normal running state, there is a possibility of engine stall when the turbine rpm is abruptly reduced, for instance, upon abrupt application of the brake. More specifically, though a lock-up release signal is generated simultaneously with application of the brake, the turbine rpm could be reduced below the lower limit during a time interval Δt for the lock-up mechanism to be actually disengaged, this time interval being due to the response time lag of the hydraulic system. However, when the third lock-up control line h3 is shifted toward the right to the lower limit of the turbine rpm over which engine stall will not be caused even upon abrupt application of the brake as shown by dotted h'3 in FIG. 6B, the lock-up is released in the region indicated at A in FIG. 6B, thereby adversely affecting the fuel economy.

SUMMARY OF THE INVENTION

In view of the foregoing observations and description, the primary object of the present invention is to provide an improved torque converter lock-up control system for an automatic transmission in which said problems inherent to the conventional systems are solved.

Another object of the present invention is to provide an improved torque converter lock-up control system for an automatic transmission in which the fuel economy can be improved without possibility of engine stall.

Still another object of the present invention is to provide an improved torque converter lock-up control system in which torque shock upon engagement or release of the lock-up can be minimized.

The reduction in the turbine rpm during deceleration of the vehicle varies depending on the transmission stage, and the lower the transmission stage is, the larger the reduction is. FIG. 6C is a graph showing, for various transmission stages, the time intervals Δt1 required for the engine rpm to be reduced to 600 rpm (as the lower limit of the engine rpm at which engine stall does not occur) when the brake is abruptly applied during running so that a deceleration degree of 0.8 g is obtained, the abscissa and the ordinate respectively representing the time interval (second) and the engine rpm. It should be noted that the engine rpm is equal to the turbine rpm so long as the lock-up is engaged. In FIG. 6C, lines indicated at S1 to S4 respectively show the time intervals Δt1 for the transmission stages of first speed to fourth speed. For example, the value of the abscissa of the intersection of the line S1 and the line of 1500 rpm represents the time interval Δt1 (first speed) required for the engine speed to be reduced to 600 rpm when the brake is abruptly applied at a time when the engine speed is 1500 rpm with the transmission stage being in the first speed. That is, Δt1 (first speed)=0.32 seconds, Δt1 (second speed) =0.58 seconds, Δt1 (third speed)=0.9 seconds, and Δt1 (fourth speed)=1.25 seconds. As can be seen from FIG. 6C, the reduction in the engine rpm is the largest at the first speed. Thus, if the third lock-up control line h3 is determined so that engine stall will not occur when the brake is abruptly applied during running with the transmission stage in the first speed, the region A in FIG. 6B is enlarged, i.e., the lock-up release zone is enlarged to limit improvement in fuel economy. On the other hand, if the third lock-up control line h3 is determined so that engine stall will not occur when the brake is abruptly applied during running with the transmission stage in the fourth stage, the engine will stall upon abrupt application of the brake during running with the transmission stage in the first speed.

Thus, in the torque converter lock-up control system of the present invention, the third lock-up control line is shifted according to the transmission stage. More particularly, the third lock-up control line is shifted toward the lower rpm side as the transmission stage becomes higher.

That is, in accordance with the present invention, there is provided a torque converter lock-up control system for an automatic transmission comprising a torque converter having input and output shafts, the input shaft being connected to an engine output shaft of an engine; a multiple stage transmission gear mechanism connected to the output shaft of the torque converter; a lock-up means adapted to be selectively engaged and disengaged to change the power transmission path between the input and output shafts of the torque converter, the lock-up means being adapted to directly connect the input and output shafts of the torque converter when engaged; a lock-up driving means for controlling the lock-up means; a rotational speed sensor for detecting the rotational speed of one of the input and output shafts of the torque converter and generating a rotational speed signal; an engine load sensor for detecting engine load and generating an engine load signal, a lock-up determination means which generates a lock-up signal or a lock-up release signal according to whether or not the operating condition of the engine represented by said rotational speed signal and the engine load signal is in a lock-up zone which is defined by first to third relations, the first relation being preset from a relation which the rotational speed and the engine load are to have with each other when the torque ratio of the engine output torque to the torque converter output torque can be considered to be 1, the second relation being preset from a relation which the rotational speed and the engine load are to have with each other when the engine output may be considered to be zero, and the third relation being preset from a lower limit of the rotational speed at which lock-up can be permitted, the lower limit being shifted toward the lower speed side of said rotational speed as said transmission stage of the transmission gear mechanism is shifted toward the higher speed stage, and the third relation being changed corresponding to the change in the lower limit of said rotational speed; and control means which generates a control signal for controlling said lock-up driving means to engage or disengage said lock-up means according to the signal generated from the lock-up determination means.

When the brake is applied during running, the operator generally first releases the accelerator pedal and then pushes down the brake pedal. As soon as the accelerator pedal is released, the throttle valve is full closed and the operating condition goes out of the lock-up zone. That is, when the brake is applied during running, the lock-up release signal is generated almost simultaneously with release of the accelerator pedal and before depression of the brake pedal by a time interval Δt2 required for the operator to shift his foot from the accelerator pedal to the brake pedal in the lock-up control system of the present invention. This means that the third lock-up control line (the third relation) may be shifted toward the lower rpm side by an amount corresponding to the time interval Δt2.

Thus, in accordance with a preferred embodiment of the present invention, said third relation is preset taking into account the time interval Δt2 required for the operator to shift his foot from the accelerator pedal to the brake pedal, said time interval Δt1 required for the engine speed to be reduced to 600 rpm, i.e., the lower limit at which engine stall does not occur, and the time interval Δt required for the lock-up mechanism to be actually disengaged, so that the lock-up zone can be as wide as possible to improve the fuel economy as long as engine does not stall upon abrupt application of the brake.

As described above, when the operating condition of the engine as defined by the turbine rpm and the opening degree of the throttle valve, for instance, is in the lock-up zone defined by the first to third lock-up control lines h1 to h3, the lock-up mechanism is engaged, while when the operating condition is outside the lock-up zone, the lock-up mechanism is disengaged. The third lock-up control line h3 is changed according to the transmission stage. For example, third lock-up control lines for the first to fourth speeds h3 (first), h3 (second), h3 (third) and h3 (fourth) are preset. The third lock-up control line h3 is determined according to the response time lag of the hydraulic system or the time interval $\Delta t$ required for the lock-up mechanism to be actually disengaged, the time interval $\Delta t2$ required for the operator to shift his foot from the accelerator pedal to the brake pedal (This time interval will be referred to as the "pedal changing time", hereinbelow.), and the reduction in the engine rpm upon deceleration. In the case of setting the third lock-up control line h3 so that engine stall does not occur even if deceleration of 0.8 g is made, assuming that the time interval $\Delta t$ is 0.6 seconds and the pedal changing time $\Delta t2$ is 0.2 seconds, a critical engine rpm from which the engine speed is reduced to 600 rpm for 0.4 seconds ($\Delta t - \Delta t2 = 0.4$) is read from FIG. 6C for each transmission stage. For example, the critical engine speed for the first speed is about 1750 rpm. Then the third lock-up control lines h3 for the first to fourth speeds are respectively set so that the values of the turbine speed n1 to n4 (FIG. 7A) corresponding to the respective third lock-control lines h3 (first) to h3 (fourth) are equal to the critical engine speeds for the first to fourth speeds.

It is preferred that the values n1 to n4 be determined taking into account various conditions of the vehicle. For example, when the tires are new and a deceleration degree of 1.0 g can be obtained, then the values n1 to n4 should be determined taking into account the reduction in the engine rpm for deceleration degree of 1.0 g instead of the same for deceleration degree of 0.8 g.

Further, said pedal changing time $\Delta t2$ varies with the amount of depression of the accelerator pedal as shown in FIG. 7B. Especially, it varies by a relatively large amount with change in the amount of depression of the accelerator pedal so long as the amount of depression is relatively small. When taking into account, in addition to this fact, the fact that the lock-up release signal is generated when the opening degree of the accelerator is small so that the engine output can be considered to be zero, the third lock-up control lines h3 may be shifted according to the amount of depression of the accelerator pedal as shown by dotted lines indicated at h'3 (first) to h'3 (fourth) in FIG. 7A.

BRIEF DESCRIPTION OF THE DRAWINGS

FIG. 12 is a graph showing a shift-up map.

DESCRIPTION OF THE PREFERRED EMBODIMENTS

Figure 1:
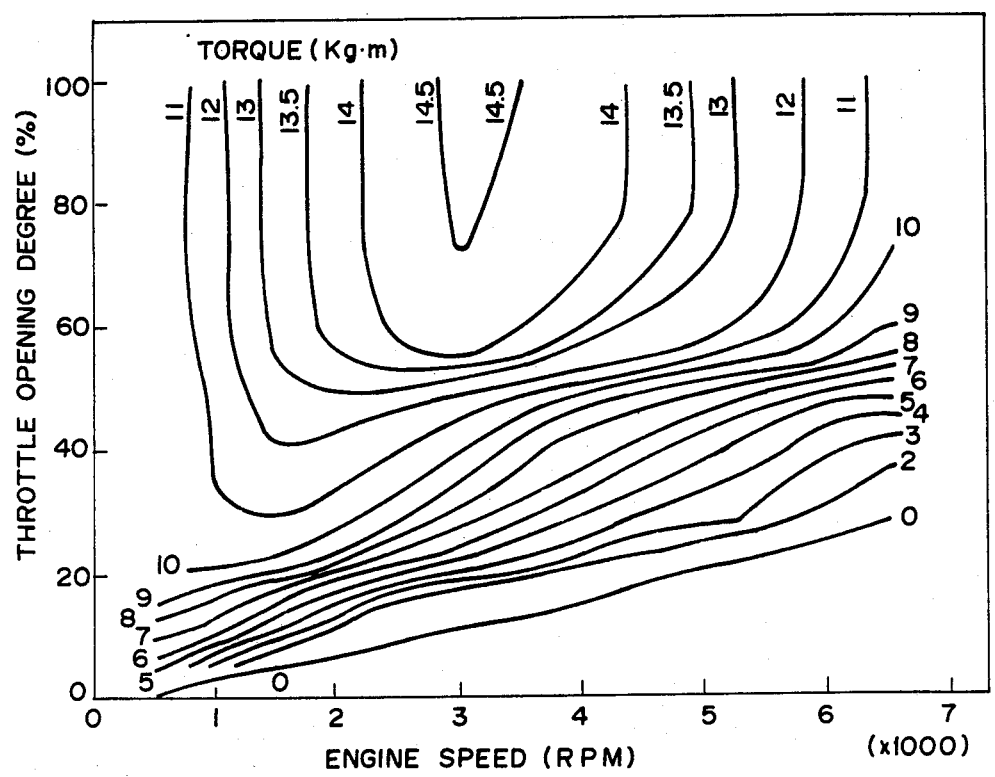
FIG. 1 is a graph showing the relationship between the engine rpm and the opening degree of the throttle valve with the torque of the output shaft of the engine being fixed at various values from 0 to 14.5 Kg·m when the engine is operated without load.
Figure 2A:
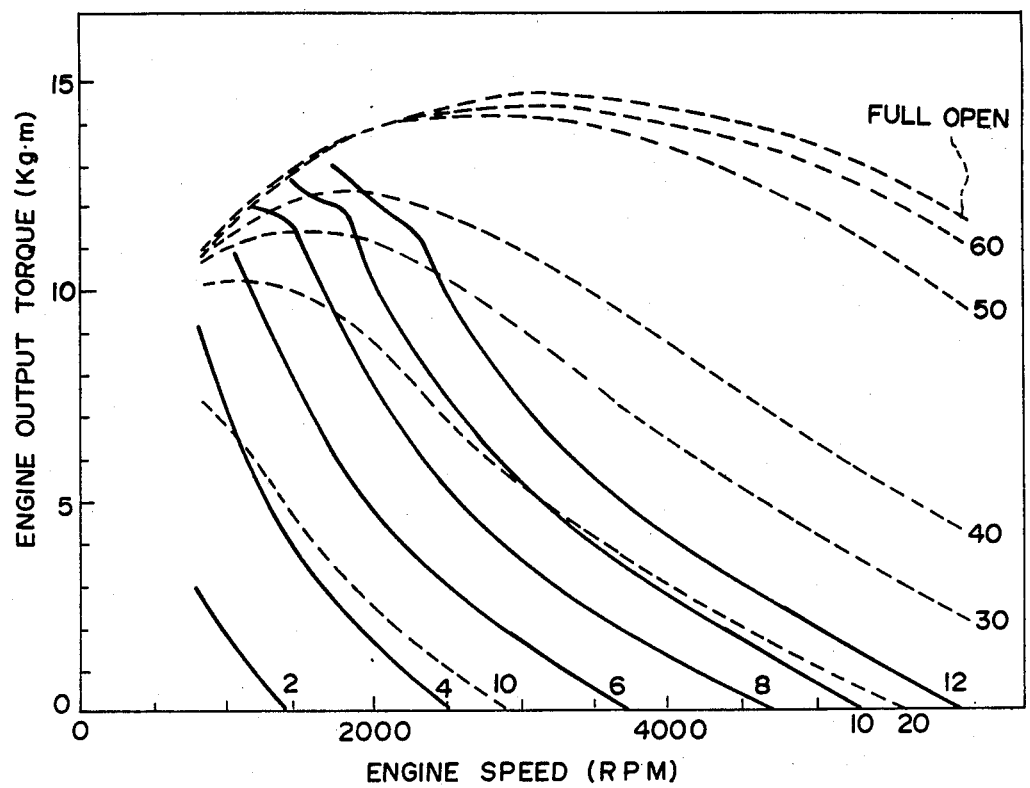
FIG. 2A is a graph showing engine rpm-engine output torque characteristic curves when the opening degree of the throttle valve is fixed at various values from 10° to full open and those when the fuel consumption ratio is fixed at various values from 2 to 12 l/h.
Figure 2B:
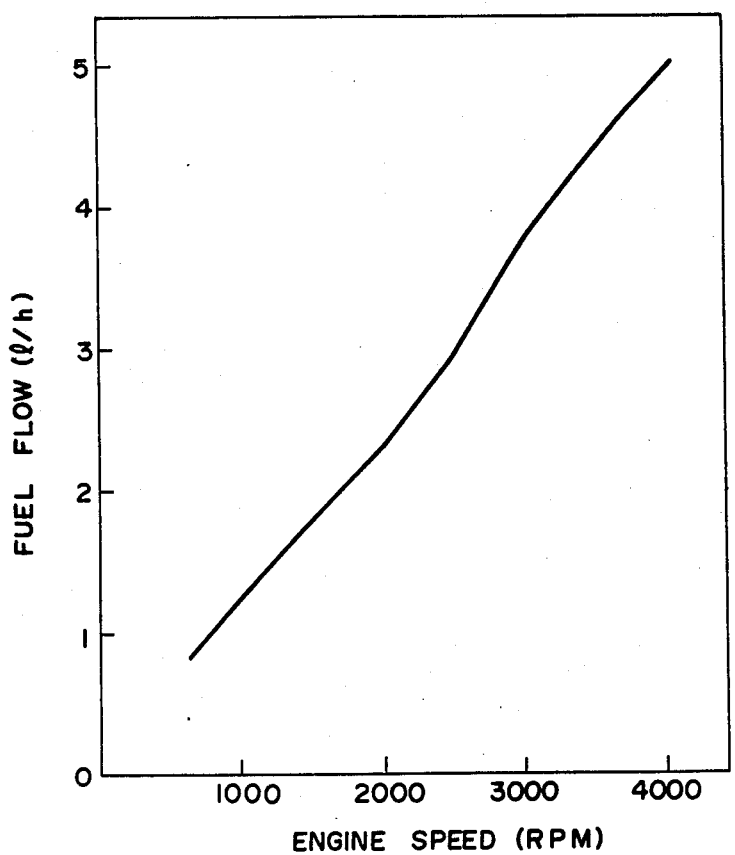
FIG. 2B is a graph showing the relationship between the engine speed and the fuel flow when the engine output torque is zero.
Figure 3:
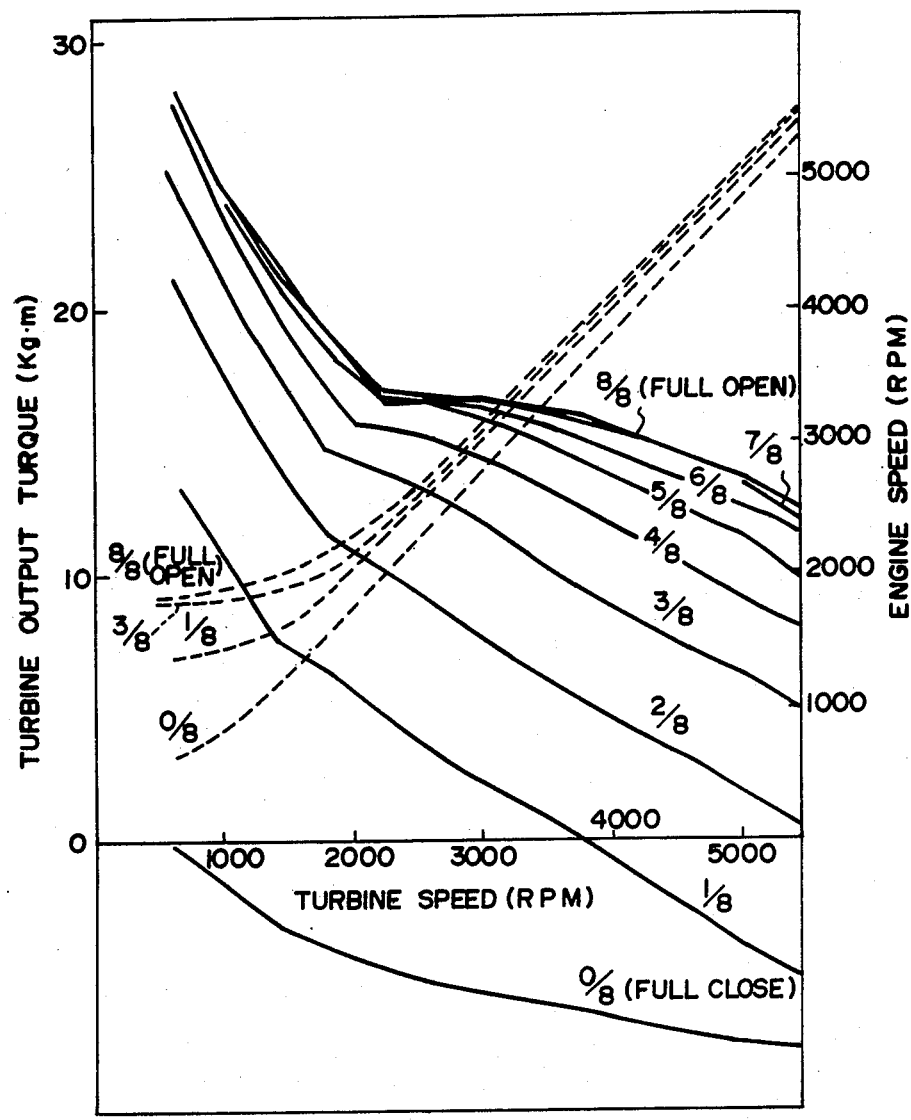
FIG. 3 is a graph showing the relationship between the turbine rpm and the engine rpm when the opening degree of the throttle valve is fixed at various values and the relationship between the turbine rpm and the torque of the turbine output shaft when the opening degree of the throttle valve is fixed at various values with the torque converter being connected to the engine output shaft.
Figure 4:
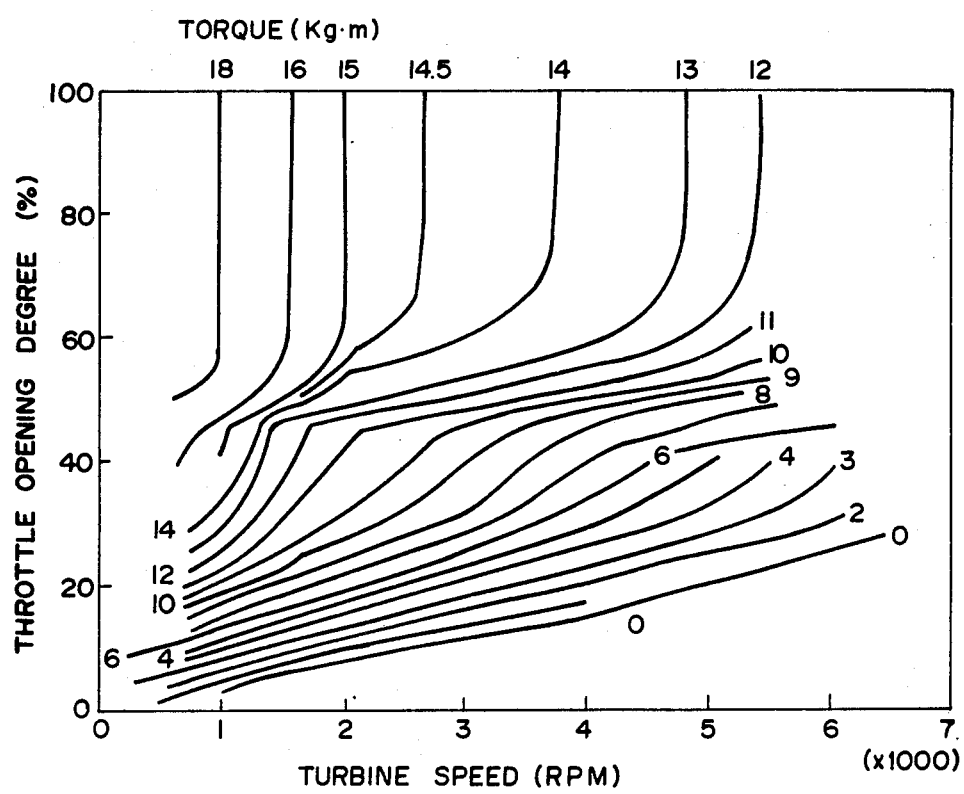
FIG. 4 is a graph showing the relationship between the turbine rpm and the opening degree of the throttle valve with the torque of the output shaft of the turbine fixed at various values.
Figure 5:
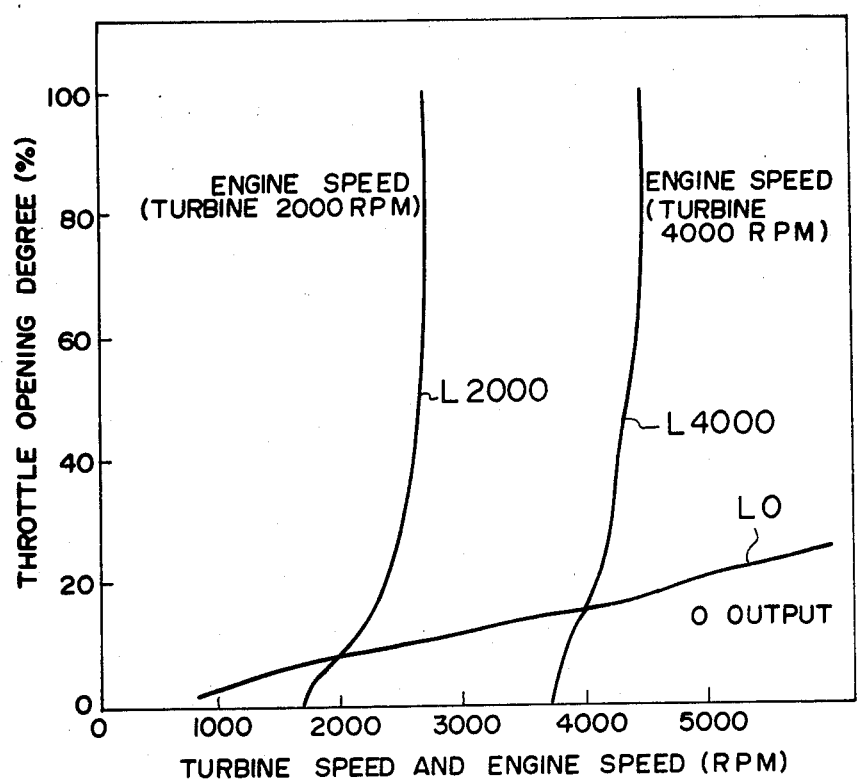
FIG. 5 is a graph showing the relationship between the engine rpm and the opening degree of the throttle valve when the turbine rpm is fixed at 2000 rpm and 4000 rpm, and the relationship between the turbine rpm and the opening degree of the throttle valve when the output torque of the turbine is zero.
Figure 6A:
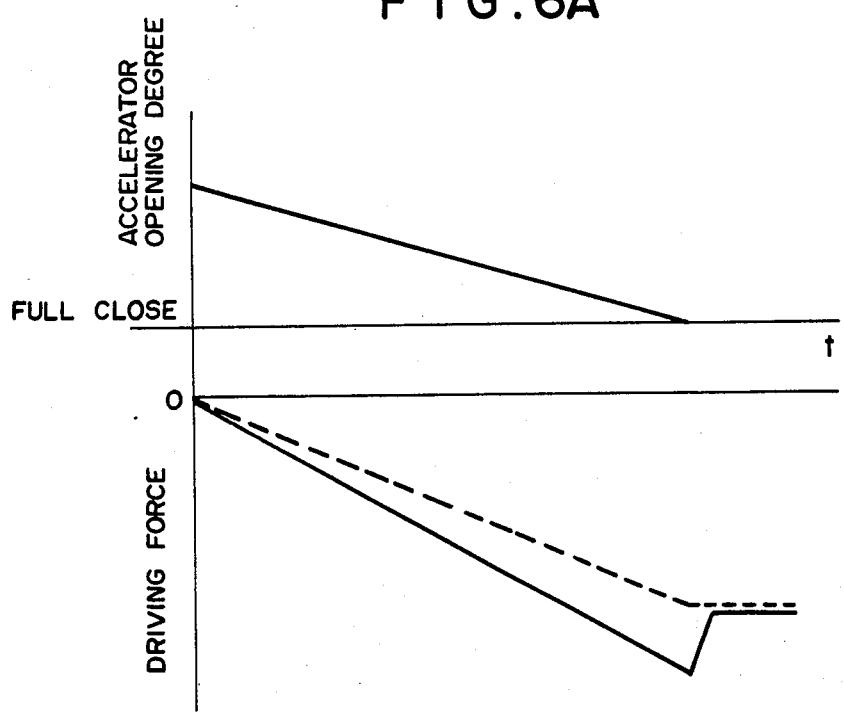
FIG. 6A is a graph showing change in driving force when the opening degree of the accelerator is gradually reduced.
Figure 6B:
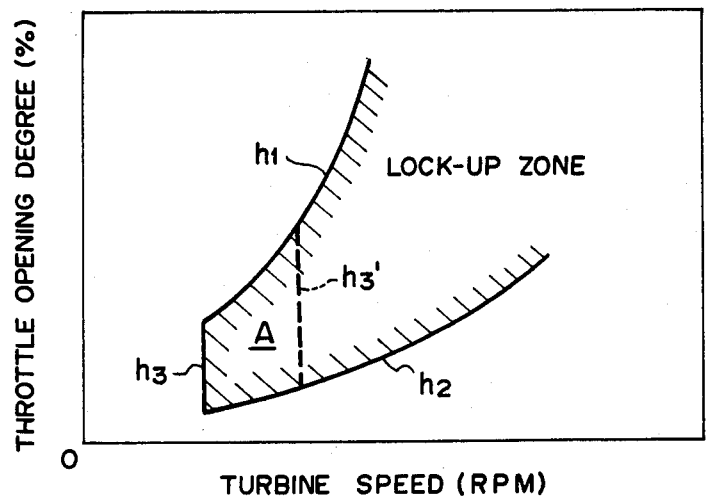
FIG. 6B shows a lock-up zone employed in the known system.
Figure 6C:
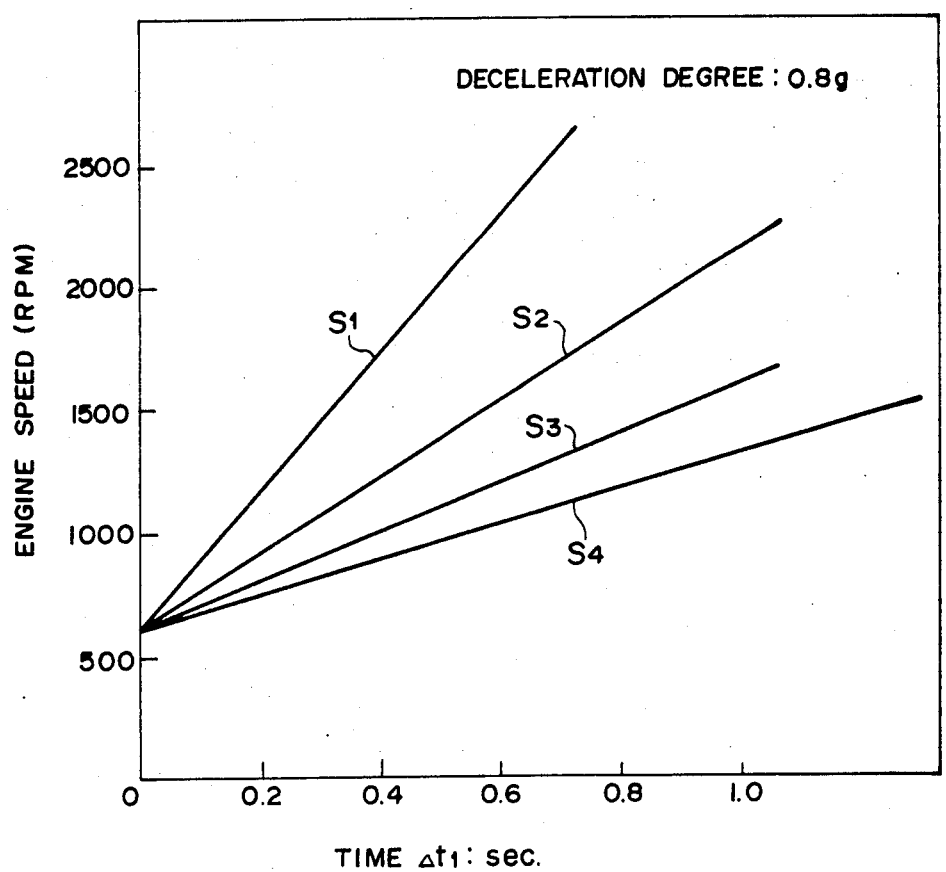
FIG. 6C is a graph showing time intervals, for various transmission stages, required for the engine rpm to be reduced to 600 rpm when the brake is abruptly applied during running.
Figure 7A:
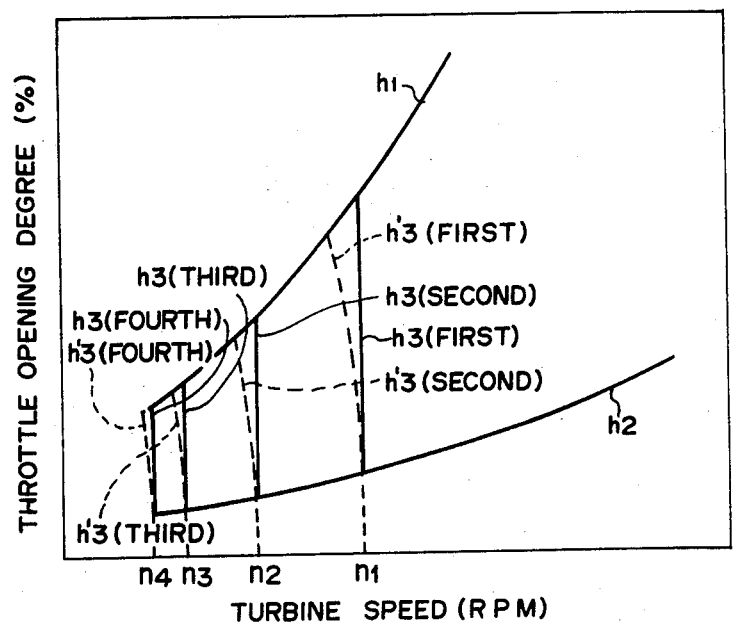
FIG. 7A shows the lock-up zone employed in the lock-up control system of the present invention.
Figure 7B:
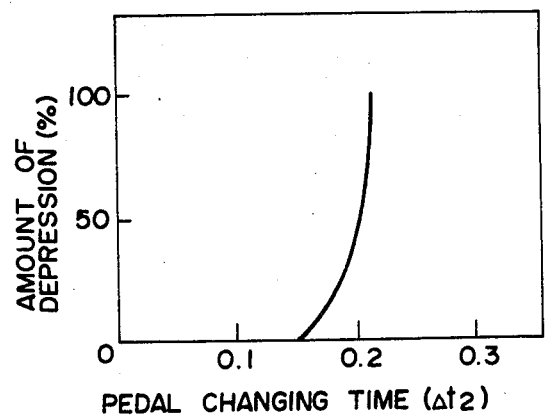
FIG. 7B is a graph showing the relationship between the amount of depression of the accelerator pedal and the time interval required for the operator to shift his foot from the pedal to the brake pedal.
Figure 8B:
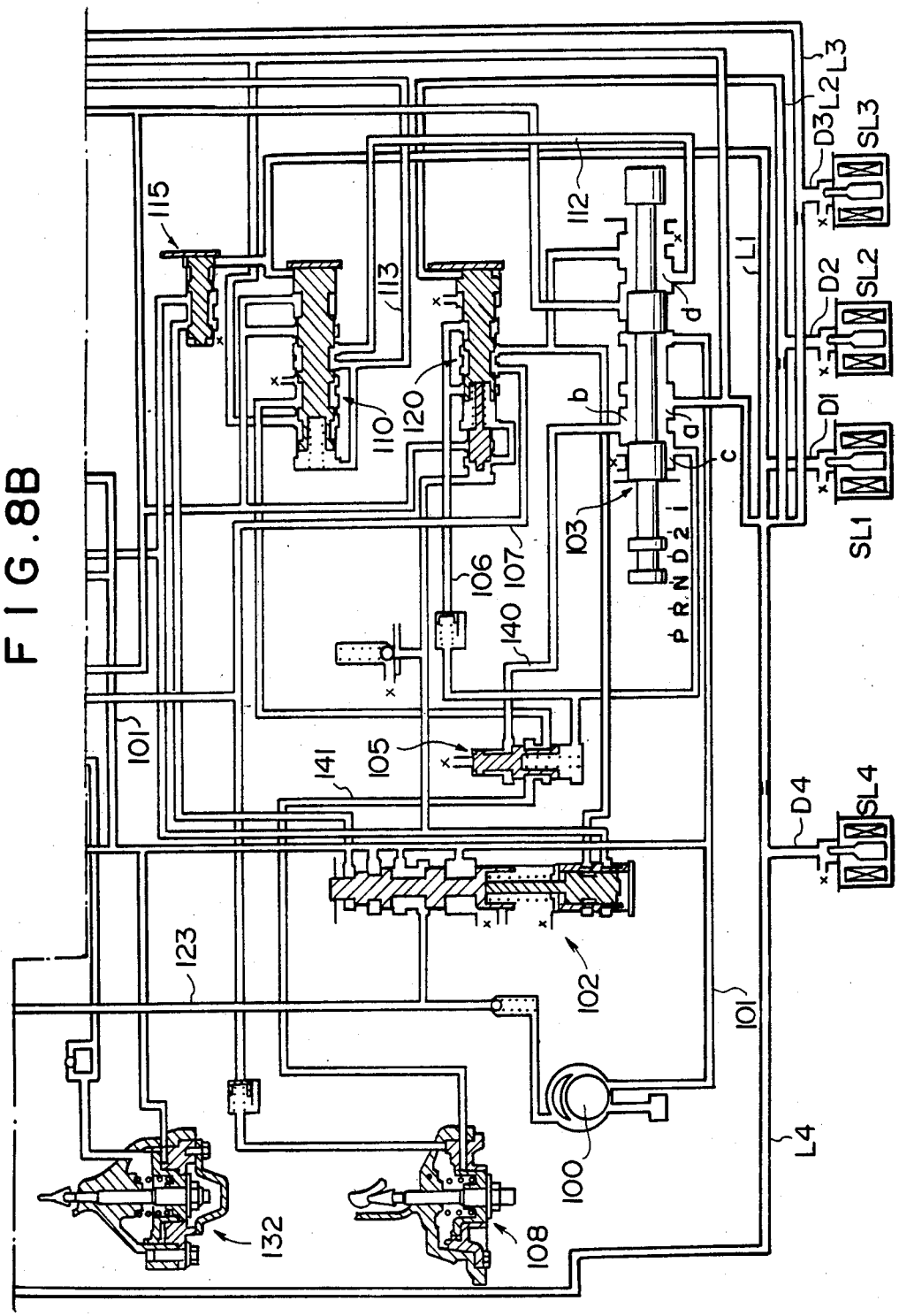
FIG. 8 is a schematic view showing an automatic transmission in which the lock-up control system of the present invention can be incorporated.

FIG. 8 shows an automatic transmission in which the lock-up control system of the present invention can be incorporated. The automatic transmission comprises a hydraulic torque converter 10, a multiple stage transmission gear mechanism 20, and a planetary gear type overdrive transmission mechanism 50 arranged therebetween.

The torque converter 10 has a pump 11 connected with an engine output shaft 1 through a converter casing 10a, a turbine 12 opposed to the pump 11 and a stator 13 disposed between the pump 11 and the turbine 12. A converter output shaft 14 is connected to the turbine 12. A lock-up clutch 15 is provided between the converter output shaft 14 and the casing 10a which is connected to the pump 11. The lock-up clutch 15 is normally engaged with the casing 10a under the pressure of a hydraulic fluid which circulates in the torque converter 10, and is released by a hydraulic pressure, which is drawn to a space between the casing 10a and the clutch 15 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 through a connecting rod 25. The gear mechanism 20 has an input shaft 26 which is connected to the connecting rod 25 and an internal gear 29 of the front planetary gear unit 21 respectively through a front clutch 27 and a rear clutch 28. A front brake 30 is provided between the connecting rod 25 or the sun gears 23, 24 and a casing of the transmission. The gear mechanism 20 also has an output shaft 34 connected with a planetary carrier 31 of the front planetary gear unit 21 and an internal gear 33 of the rear planetary gear unit 22. The rear planetary gear unit 22 has a planetary carrier 35, and there are provided between the planetary carrier 35 and the transmission casing a rear brake 36 and a one-way clutch 37.

The planetary gear type overdrive transmission mechanism 50 includes planetary gears 51, and a planetary carrier 52 rotatably carrying the planetary gears 51 and connected with the output shaft 14 of the torque converter 10. A sun gear 53 is connected to an internal gear 55 by way of a direct connecting clutch 54. An overdrive brake 56 is provided between the sun gear 53 and the transmission casing. The internal gear 55 is connected with the input shaft 26 of the multiple stage transmission gear mechanism 20.

The multiple stage transmission gear mechanism 20 is of known type and can provide three forward driving gear stages and one reverse stage. The planetary gear type overdrive transmission mechanism 50 connects the shafts 14 and 26 directly when the direct connection clutch 54 is engaged and the brake 56 is released, and provides an overdrive connection between the shafts 14 and 26 when the brake 56 is engaged and the clutch 54 is released.

Hydraulic Control Circuit

The above-mentioned automatic transmission is provided with a hydraulic control circuit as shown in FIG. 8. The hydraulic control circuit has an oil pump 100 which is driven by the engine output shaft 1. Hydraulic oil is discharged under pressure from the pump 100 into a pressure line 101. The oil pressure is reduced by a pressure regulating valve 102 and applied to a select valve 103. The select valve 103 has a plunger which can be selectively positioned in one of shift positions 1, 2, D, N, R, P, and when the plunger is positioned in one of the shift positions 1, 2 and P, the pressure line 101 is communicated with ports a, b, c of the select valve 103. The port a is communicated with a hydraulic actuator 104 for the rear clutch 28. When the select valve 103 is positioned in the above mentioned position, the rear clutch 28 is kept engaged. The port a is also communicated with the left-hand end portion of a 1-2 shift valve 110 having a spool which is biased rightward in FIG. 8 under the oil pressure from the port a. The port a is further communicated with the right-hand end portion of the 1-2 shift valve 110 through a first line L1, the right-hand end portion of a 2-3 shift valve 120 through a second line L2, and the right-hand end portion of a 3-4 shift valve 130 through a third line L3. First, second and third drain lines D1, D2 and D3 are provided in the first, second and third lines L1, L2 and L3, respectively. These drain lines D1, D2 and D3 are respectively provided with first, second and third solenoid valves SL1, SL2 and SL3 for opening and closing them. When the port a is communicated with the line 101, the solenoid valves LS1, SL2 and SL3 are energized to close the drain lines D1, D2, D3, and as a result, the pressure in the first, second and third line L1, L2, L3 increases.

The port b is communicated with a second lock valve 105 through a line 140. The oil pressure which is applied from the port b to the second lock valve 105 acts to bias the spool of the valve 105 downwards. When the spool of the valve 105 is in the lower position, the line 140 is communicated with a line 141 so that the oil pressure is introduced into a brake engaging pressure chamber of an actuator 108 to engage the front brake 30. The port c is communicated with the second lock valve 105. The oil pressure which is applied from the port c to the second lock valve 105 acts to bias the spool of the valve 105 upward. The port c is also communicated with the 2-3 shift valve 120 through a pressure line 106. The line 106 is communicated with a line 107 when the spool of the 2-3 shift valve 120 is moved leftward by the pressure in the second line L2 which increases upon energizing of the solenoid valve SL2 in the second drain line D2. The line 107 is communicated with the releasing pressure chamber of the actuator 108. When oil pressure is introduced into such releasing pressure chamber, the actuator 108 is moved to release the brake 30 overcoming the pressure in the engaging pressure chamber. Besides, the pressure in the line 107 is introduced into an actuator 109 for the front clutch 27 to engage the clutch 27.

The select valve 103 has a port d which is communicated with a pressure line 101 when the valve 103 is positioned in the shift position 1. The port d is communicated with the 1-2 shift valve 110 through a line 112, and further with an actuator 114 for the rear brake 36 through a line 113. When the solenoid valves SL1 and SL2 are energized, the spools of the 1-2 shift valve 110 and the 2-3 shift valve 120 are moved to thereby change the port connections for engaging appropriate brakes and/or clutches to establish 1-2, 2-3 shifting operations respectively. The hydraulic control circuit is also provided with a cut-back valve 115 for making the oil pressure from the pressure regulating valve 102 stable, a vacuum throttle valve 116 for varying the line pressure from the pressure regulating valve 102 according to the suction pressure in the engine intake passage, and a valve 117 for backing up the throttle valve 116.

Furthermore, this hydraulic control circuit is provided with the 3-4 shift valve 130 and an actuator 132 for controlling the clutch 54 and the brake 56 of the planetary gear type overdrive transmission mechanism 50. The actuator 132 has an engaging pressure chamber communicated with the pressure line 101. The brake 56 is urged in the engaging direction under the pressure in the line 101. When the solenoid valve SL3 is energized, the spool 131 of the 3-4 shift valve 130 is moved downward to break communication between the pressure line 101 and a line 122, thereby draining the line 122. This releases pressure acting on a releasing pressure chamber of the actuator 132 to release the brake 56, and makes the clutch 54 disengaged.

Still further, the present hydraulic control circuit is provided with a lock-up control valve 133, which is communicated with the port a of the select valve 103 through a line L4. Branching from the line L4 is a drain line D4 which is provided with a solenoid valve SL4. When the pressure in the line L4 increases by closing of the drain line D4 with the solenoid valve SL4 being energized, the lock-up control valve 133 has its spool moved to cut the communication between lines 123 and 124 and drain the pressure in the line 124 so that the lock-up clutch 15 is engaged.

In the above arrangement, the relations of the respective transmission stages and the lock-up with respect to the operations of the solenoids, the clutches and the brakes are shown in Tables 1 to 3.

TABLE 1

| Shift Position | Solenoid Valve 1 | 2 | 3 |
|---|---|---|---|
| 1 | OFF | OFF | OFF |
| 2 | ON | OFF | OFF |
| 3 | ON | ON | OFF |
| 4 | ON | ON | ON |

TABLE 2

| SL4 | Lock-up |
|---|---|
| ON | engage |
| OFF | release |

TABLE 3

| | clutch 28 | clutch 27 | clutch 15 | clutch 54 | brake 36 | brake 30 | brake 56 | one-way clutch 37 | gear ratio |
|---|---|---|---|---|---|---|---|---|---|
| P | | | | O | | | | | |
| R | | O | | O | O | | | | 2.181 |
| N | | | | O | | | | | |
| D first | O | | | O | | | | O | 2.458 |
| second | O | | (O) | O | | O | | | 1.458 |
| third | O | O | (O) | O | | | | | 1.000 |
| OD | O | O | (O) | | | | O | | 0.685 |
| 2 | O | | | O | | O | | | 1.458 |
| 1 first | O | | | O | | | O | | 2.458 |
| second | O | | | O | | O | | | 1.458 |

Electronic Control Circuit

Figure 9A:
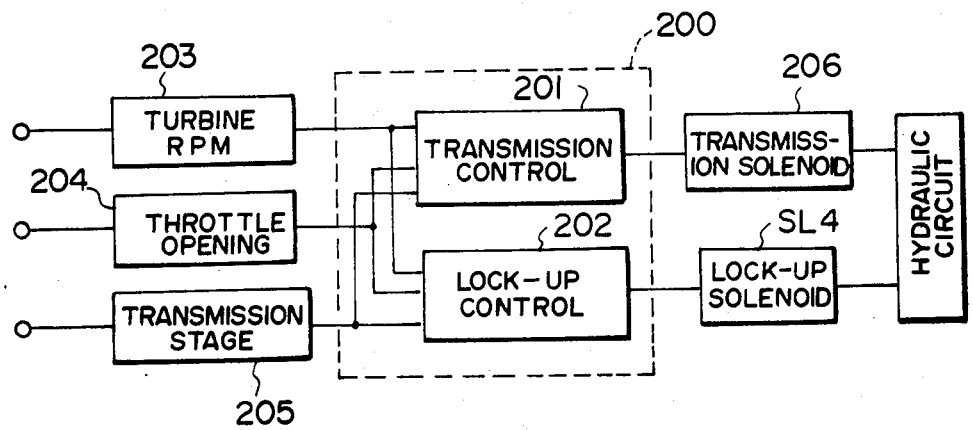
FIG. 9A is a schematic view showing the electronic control circuit for controlling the hydraulic circuit of the of FIG. 8.

In FIG. 9A, there is shown an electronic control circuit 200 for controlling the above hydraulic control circuit.

Figure 9B:
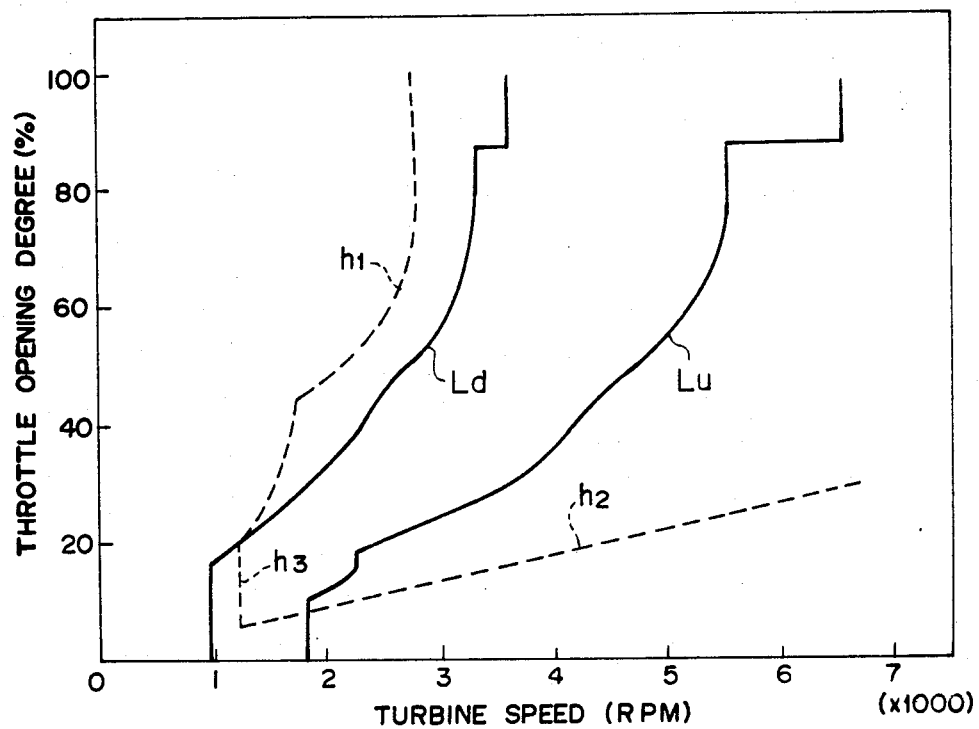
FIG. 9B is a graph showing the turbine rpm-engine load characteristics.

The electronic control circuit 200 comprises a transmission control circuit 201 for controlling a transmission solenoid system 206 including the solenoid valves SL1 to SL3 respectively for the 1-2 shift valve 110, the 2-3 shift valve 120 and the 3-4 shift valve 130, and a lock-up control circuit 202 for controlling the lock-up solenoid SL4. Into the transmission control circuit 201 and the lock-up control circuit 202 are inputted detecting signals of a turbine rpm sensor 203 for detecting the rotational speed of the torque converter output shaft, a throttle opening degree sensor 204 for detecting the engine load from the opening degree of the throttle valve in the intake passage of the engine, and a transmission stage sensor 205 for detecting the position of the multiple stage transmission gear mechanism. Whether or not a shift operation should be carried out and whether or not lock-up should be carried out are determined in the electronic control circuit 200 by judging the operating condition represented by the detecting signals of the sensors 203 to 205 referring to a shift-up control line Lu, a shift-down control line Ld, and lock-up control lines h1 to h3 which are determined on the basis of, for example, the turbine rpm-engine load characteristics shown in FIG. 9B, and according to the determination, the transmission solenoid system 206 and the lock-up solenoid SL4 are controlled. As described above, the first lock-up control line h1 is determined on the basis of a line on which the torque ratio or the ratio of the input torque to the output torque of the torque converter is substantially 1, and the second lock-up control line h2 is determined on the basis of the line on which the torque of the engine output shaft is substantially zero. The first and second lock-control lines h1 and h2 are fixed irrespective of the transmission stage. On the other hand, the third lock-up control line h3 is determined on the basis of the lower limit at which engine stall does not occur even when the brake is abruptly applied, and is changed according to the transmission stage detected by the transmission stage sensor 205.

Figure 10:
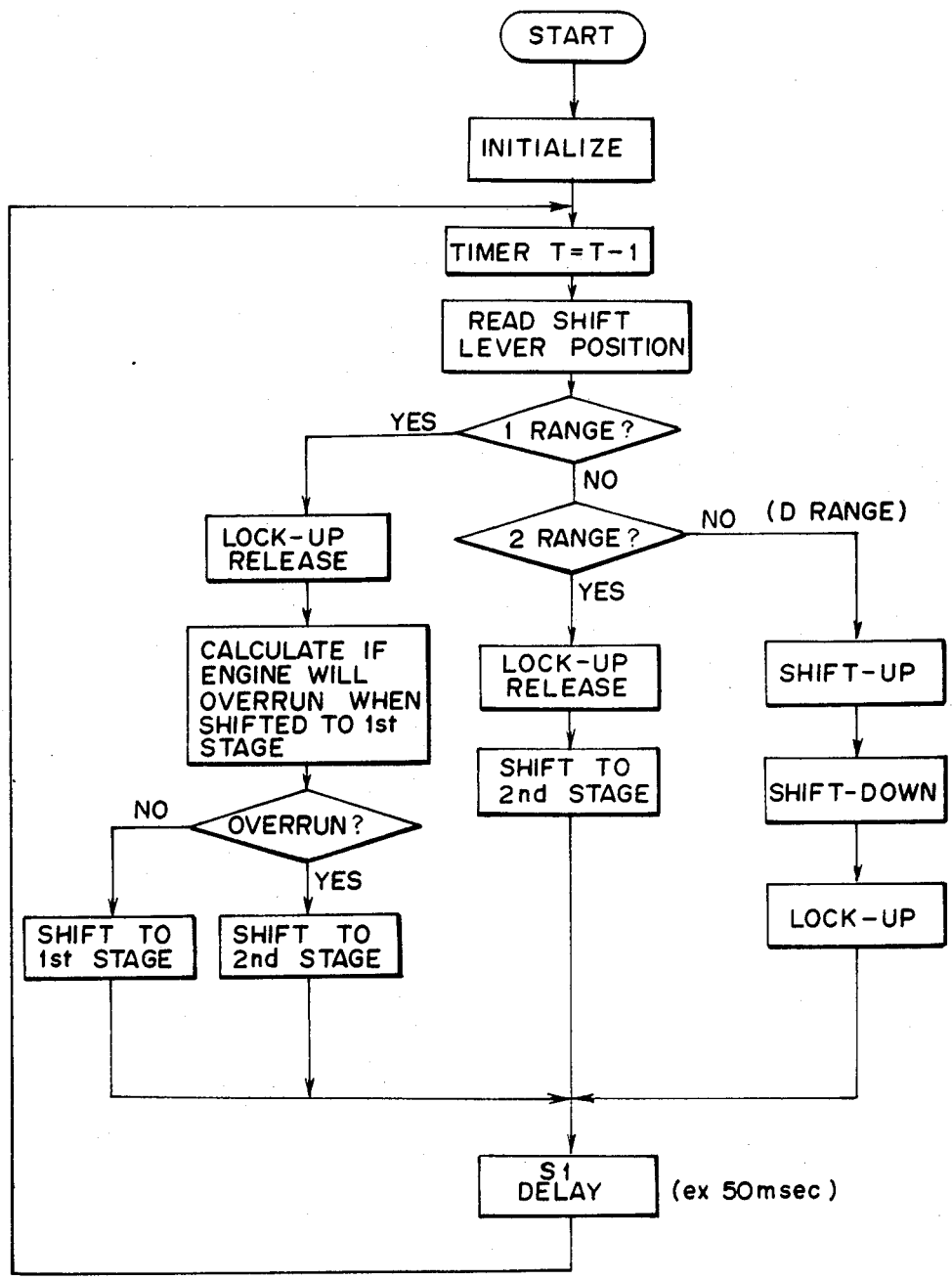
FIG. 10 is a flow chart showing the operation of the electronic control circuit shown in FIG. 9A.

Preferably the electronic control circuit 200 comprises a microcomputer which is programmed to accomplish operations in accordance with the flow chart shown in FIG. 10, for example.

Now referring to the flow chart shown in FIG. 10, the program is first initialized so that the ports in the respective hydraulic control valves and the counters in the circuit are brought into initialized positions to thereby hold the transmission gear mechanism at the first stage and release the torque converter lock-up clutch 15. Thereafter, various working areas of the electronic control circuit 200 are initialized.

Then, the value of a timer T is replaced by the value obtained by subtracting 1 from the value of the timer T for setting the speed at which the steps of flow chart are to be performed. This means that the timer is reset after the flow chart is performed twenty times assuming that the value of T is 20, and when the timer is set every second, the main program is performed twenty times a second.

Thereafter, the shift range or the position of the select valve 103 is read and a judgement is carried out as to whether the shift range is at the "1" range. If the judgement is NO, a further judgement is carried out as to whether the shift range is at the "2" range. If the judgement is YES, signals are applied to the shift valves to release the lock-up and to fix the gear mechanism 20 at the second stage. Subsequently, step S1 is performed. If the judgement is to indicate that the shift range is not at the second stage, it is interpreted that the shift range is "D" range, and appropriate control maps are selected according to the transmission stages in the "D" range. Thereafter, controls of the gear shift-up, gear shift-down and lock-up are carried out in this order in accordance with the selected maps. The gear shift-up control is performed according to the subroutine shown in FIG. 11. The gear shift-down control and the lock-up control are performed according to the subroutines shown in FIGS. 13 and 15, respectively. If the judgement indicates that the shift range is "1" range, a signal is produced to release the lock-up clutch and thereafter an operation is made as to whether the engine will overrun when the gear mechanism is shifted down to the first stage. When the result of the operation indicates that there will be no engine overrun, the gear mechanism is shifted to the second stage. Then, the step S1 is performed.

In the step S1, a predetermined time delay e.g. 50 msec. is created for determining the speed at which this flow chart is to be performed. The time delay is related to the timer T, and if the initial value of the timer T=20, the timer T is reset every time the delay of 50 msec. is repeated twenty times, that is the timer T is reset every second.

Shift-up Control

Figure 11:
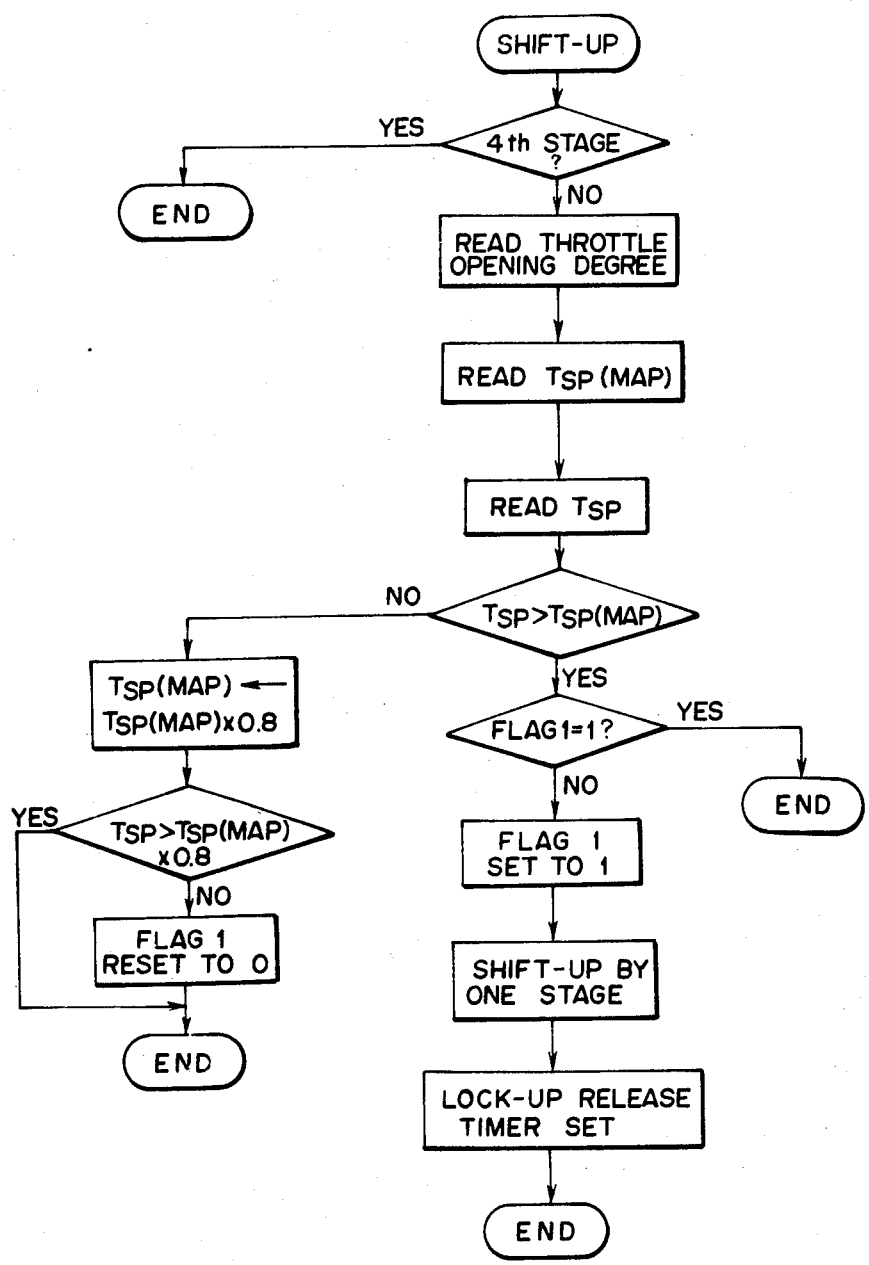
FIG. 11 is a flow chart showing the subroutine for performing the gear shift-up control.

As shown in FIG. 11, the gear position of the transmission gear mechanism 20 is first read and it is determined whether or not the gear mechanism 20 is at the fourth stage. If YES, the shift-up control is terminated because no further shift-up is possible. If NO, the opening degree of the throttle valve is read from the detecting signal of the throttle opening degree sensor 204, and then the turbine speed TSP (MAP) corresponding to the detected opening degree of the throttle valve is read out from a shift-up map, for instance, shown in FIG. 12. That is, the turbine rpm corresponding to the detected opening degree of the throttle valve on the shift-up control line Lu (solid line) in FIG. 12 is read out. Then the actual turbine speed TSP is read from the detecting signal of the turbine rpm sensor 203 and the actual turbine speed TSP is compared with the turbine speed TSP (MAP) corresponding to the detected opening degree of the throttle valve on the shift-up control line Lu (This turbine speed TSP (MAP) will be referred to as "map turbine speed TSP (MAP)", hereinbelow.) to determine whether or not the actual turbine speed TSP is larger than the map turbine speed TSP (MAP). If NO, i.e., if the actual turbine speed TSP is not larger than the map turbine speed TSP (MAP), a second shift-up control line Lu' (dotted line) is set by multiplying the shift-up control line Lu by 0.8. Then the turbine speed corresponding to the detected opening degree of the throttle valve on the second shift-up control line Lu' which is equal to TSP (MAP)×0.8 is compared with the actual turbine speed to determine whether or not the latter is larger than the former. If YES, that is when the actual turbine speed TSP is on the higher rpm side (right side) of the second shift-up control line Lu', the shift-up control is terminated. Otherwise, the shift-up control is terminated after resetting a flag 1 to "0". The flag 1 is set when shift-up is carried out to memorize that shift-up has been made. If said determination as to whether the actual turbine speed TSP is larger than the map turbine speed TSP (MAP) is YES, i.e., TSP > TSP (MAP), determination is made as to whether or not the flag 1 is "1". If YES, i.e., flag 1=1, the shift-up control is terminated since flag 1=1 means that shift-up has already been performed. If NO, shift-up is performed after the flag 1 is set (flag 1=1). At this time, the lock-up release timer is operated simultaneously with the performance of shift-up to release lock-up for a predetermined time interval to facilitate smooth shift-up.

Figure 13:
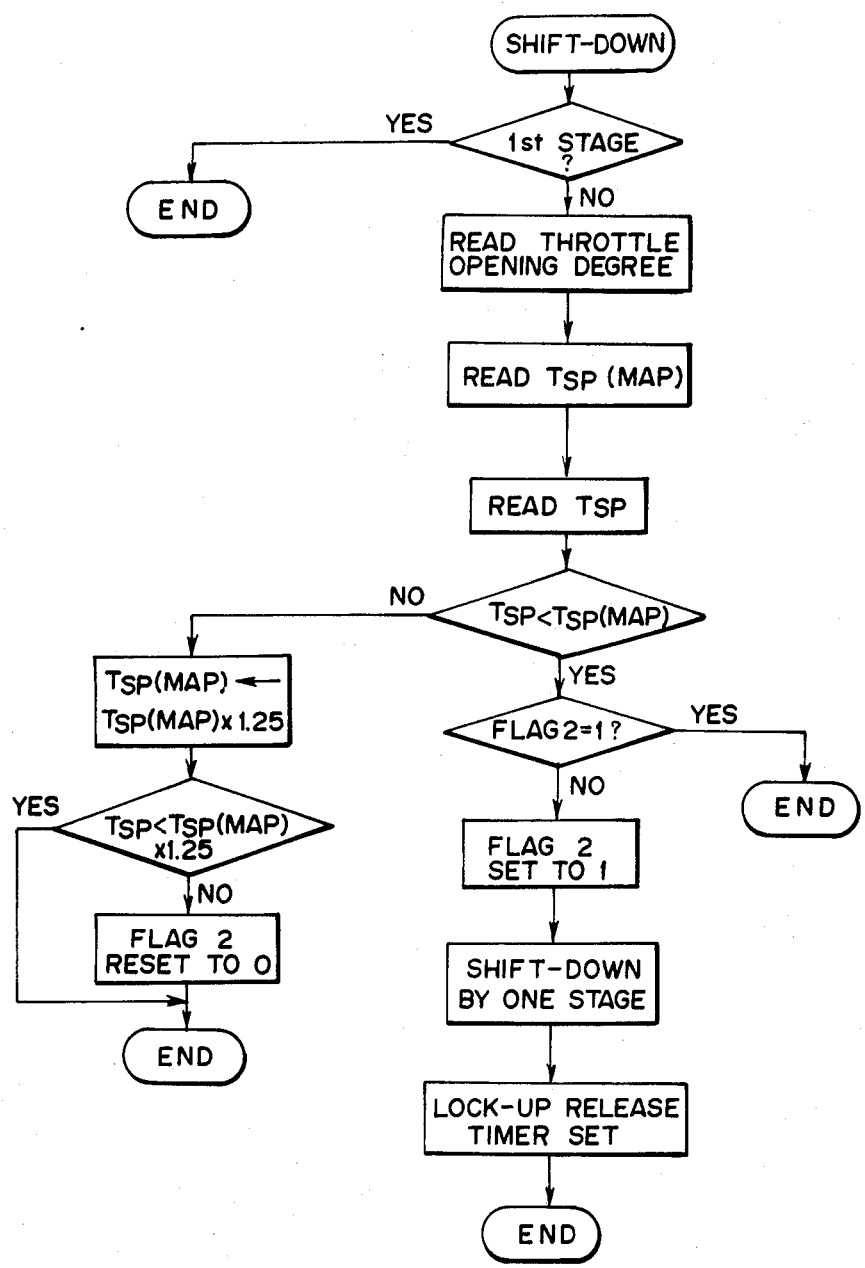
FIG. 13 is a flow chart showing the subroutine for performing the gear shift-down control.

After the shift-up control is thus carried out, the shift-down control is carried out according to the subroutine shown in FIG. 13.

Shift-down Control

Figure 14:
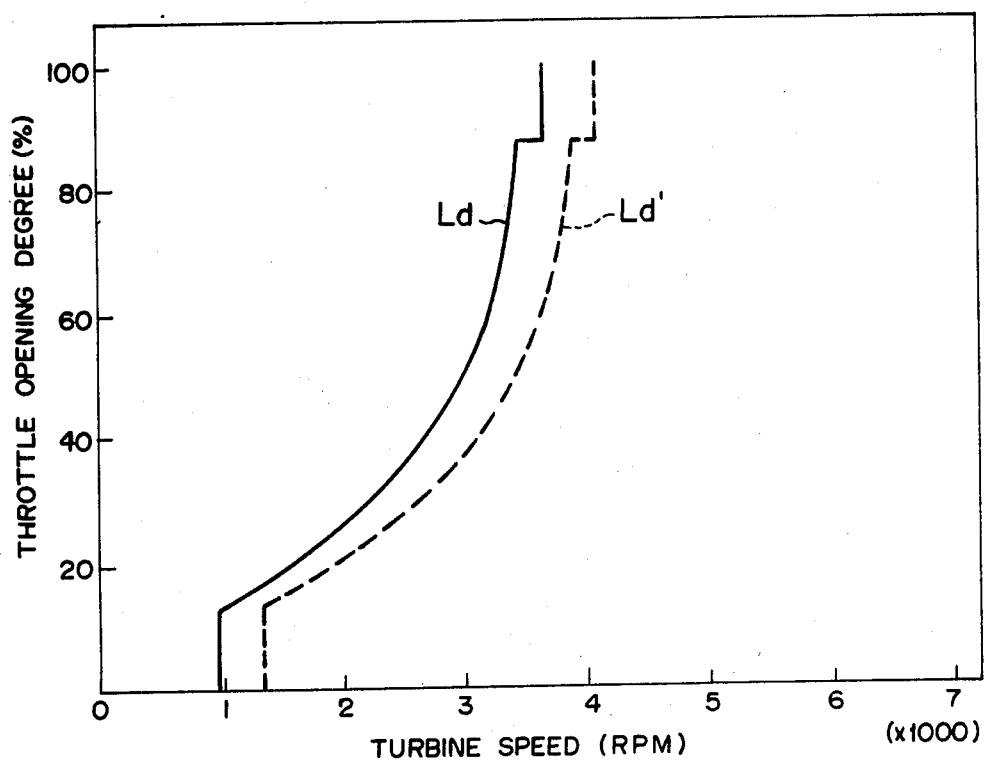
FIG. 14 is a graph showing a shift-down map.

As shown in FIG. 13, the gear position of the transmission gear mechanism 20 is first read and it is determined whether or not the gear mechanism 20 is at the first stage. If YES, the shift-down control is terminated because no further shift-down is possible. If NO, the opening degree of the throttle valve is read from the detecting signal of the throttle opening degree sensor 204, and then the turbine speed TSP (MAP) corresponding to the detected opening degree of the throttle valve is read out from a shift-down map, for instance, shown in FIG. 14. That is, the turbine rpm corresponding to the detected opening degree of the throttle valve on the shift-down control line Ld (solid line) in FIG. 14 is read out. Then the actual turbine speed TSP is read from the detecting signal of the turbine rpm sensor 203 and the actual turbine speed TSP is compared with the turbine speed TSP (MAP) corresponding to the detected opening degree of the throttle valve on the shift-down control line Ld (This turbine speed TSP (MAP) will be referred to as "map turbine speed TSP (MAP)", hereinbelow.) to determine whether or not the actual turbine speed TSP is larger than the map turbine speed TSP (MAP). If YES, i.e., if the actual turbine speed TSP is larger than the map turbine speed TSP (MAP), a second shif-tdown control line Ld' (dotted line) is set by multiplying the shift-down control line Ld by 1.25. Then the turbine speed corresponding to the detected opening degree of the throttle valve on the second shift-down control line Ld' which is equal to TSP (MAP)×1.25 is compared with the actual turbine speed to determine whether or not the latter is larger than the former. If NO, that is when the actual turbine speed TSP is on the lower rpm side (left side) of the second shift-down control line Ld', the shift-down control is terminated. Otherwise, the shift-down control is terminated after resetting a flag 2 to "0". The flag 2 is set when shift-down is carried out to memorize that shift-down is made. If said determination as to whether the actual turbine speed TSP is larger than the map turbine speed TSP (MAP) is NO, i.e., TSP TSP (MAP), determination is made as to whether or not the flag 2 is "1". If YES, i.e., flag 2=1, the shift-down control is terminated since flag 2=1 means that shift-down has already been performed. If NO, shift-down is performed after the flag 2 is set (flag 2=1). At this time, the lockup release timer is operated simultaneously with the performance of shift-down to release lock-up for a predetermined time interval to facilitate smooth shift-down.

Figure 15:
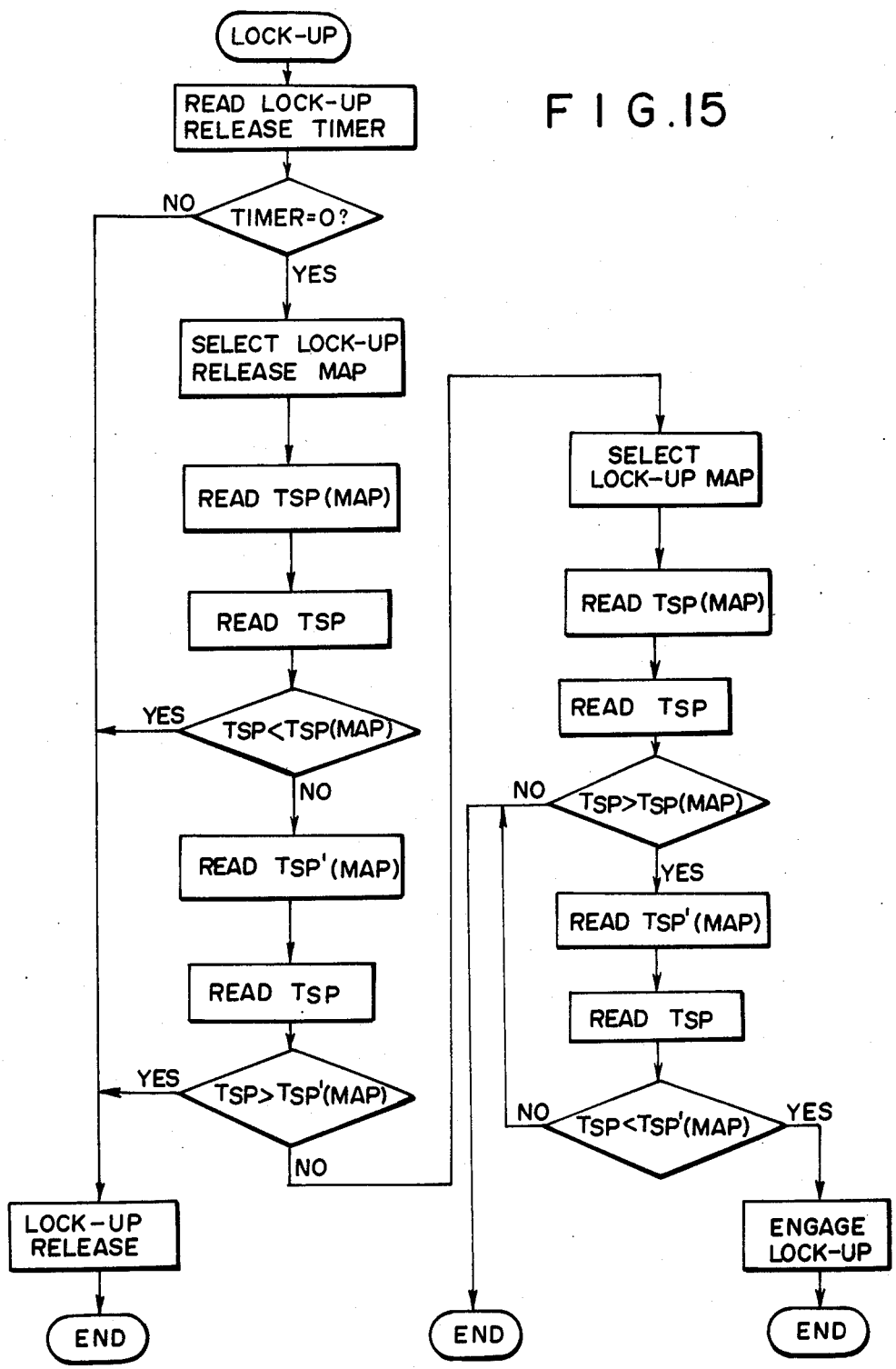
FIG. 15 is a flow chart showing the subroutine for performing the lock control.

After the shift-down control is thus carried out, the lock-up control is carried out according to the subroutine shown in FIG. 15.

Lock-up Control

Figure 16A:
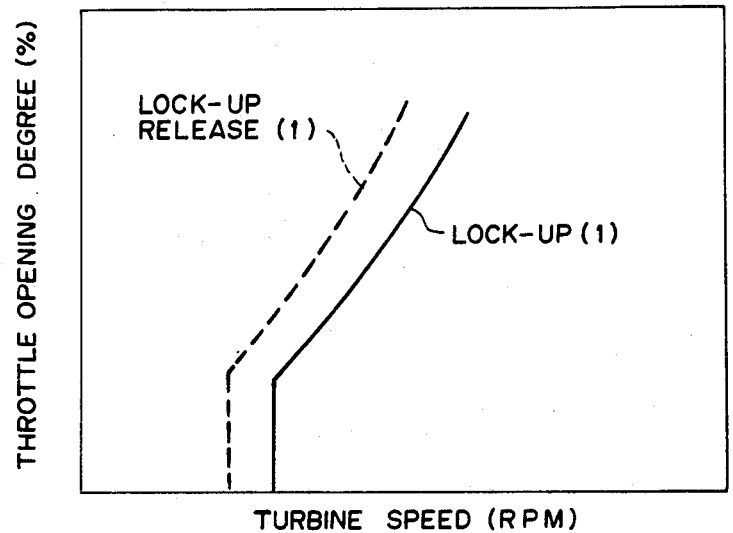
FIG. 16A is a graph showing the first lock-up release map and the first lock-up map.
Figure 16B:
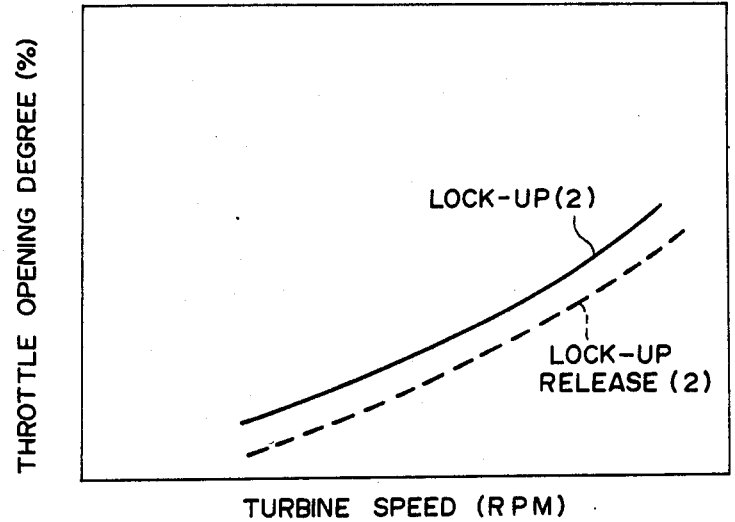
FIG. 16B is a graph showing the second lock-up release map and the second lock-up map.

As shown in FIG. 15, in the lock-up control, the lock-up release timer is first read out and then it is determined whether or not the lock-up release timer has been operated, i.e., whether or not the timer is equal to zero. If NO, the lock-up is released and this flow is terminated. On the other hand if YES, i.e., the timer =0, a first lock-up release map (1) corresponding to the gear stage is selected. The first lock-up release map (1) is as shown by the dotted line in FIG. 16A and comprises said first lock-up control line h1 and the third lock-up control line h3, the third lock-up control line h3 being changed according to the gear shift stage of the transmission as described above. Then a map turbine speed TSP (MAP) corresponding to the detected opening degree of the throttle valve on the first lock-up release map (1) is read and is compared with the actual turbine speed TSP represented by the detecting signal of the turbine rpm sensor 203 to determine whether or not the latter is smaller than the former. If YES, i.e., if the actual turbine speed TSP is on the lower rpm (left) side of the first lock-up release map (1), the lock-up is released and the lock-up control is finished. Otherwise, a second map turbine speed TSP' (MAP) corresponding to the detected opening degree of the throttle valve on a second lock-up release map (2) which is shown by the dotted line in FIG. 16B and consists of said second lock-up control line h2 is read out and is compared with the actual turbine speed TSP represented by the detecting signal of the turbine rpm sensor 203. When the latter is larger than the former, the lock-up is released and the lock-up control is finished. When the second map turbine speed TSP' (MAP) is not smaller than the actual turbine speed TSP, a first lock-up map (1) corresponding to the gear shift stage is selected. The first lock-up map (1) is as shown by the solid line in FIG. 16A. The first lock-up map (1) is defined to have hysteresis with respect to the first lock-up release map (1) in order to avoid hunting and is disposed on the higher rpm side of the same substantially parallel thereto. Then a first map turbine speed TSP (MAP) corresponding to the opening degree of the throttle valve on the first lock-up map (1) is read out to be compared with the actual turbine speed TSP. When the former is not smaller than the latter, the lock-up is held as it is. That is, when the lock-up is released, it is kept released, and when the lock-up is engaged, it is kept engaged. And then the lock-up control is finished. Otherwise, a second map turbine speed TSP' (MAP) corresponding to the detected opening degree of the throttle valve on a second lock-up map (2) which is as shown by the solid line in FIG. 16B and is defined to have hysteresis with respect to the second lock-up release map (2). The second map turbine speed TSP' (MAP) is compared with the actual turbine speed TSP. When the former is not larger than the latter, the lock-up is held as it is and the lock-up control is finished. Otherwise, the lock-up is engaged and the lock-up control is finished.

Though in the embodiment described above, the first and second lock-up release maps are defined to represent said first to third lock-up control lines h1 to h3 and the first and second lock-up maps are defined to have hysteresis with respect to the first and second lock-up release maps, the first and second lock-up control lines may be defined to represent the first to third lock-up control lines and the first and second lock-up release maps may be defined to have hysteresis with respect thereto. However, it is preferred to define the first and second lock-up release maps to represent the first to third lock-up control lines as in the embodiment described above in view of the shock produced upon released of the lock-up.

We claim:

1. A torque converter lock-up control system for an automatic transmission comprising a torque converter having input and output shafts, the input shaft being connected to an output shaft of an engine; a multiple stage tramsmission gear mechanism connected to the output shaft of the torque converter; a lock-up means adapted to be selectively engaged and disengaged to change the power transmission path between the input and output shafts of the torque converter, the lock-up means being adapted to directly connect the input and output shafts of the torque converter when engaged; a lock-up driving means for controlling the lock-up means; a rotational speed sensor for detecting the rotational speed related to one of said input and output shafts of the torque converter and generating a rotational speed signal; an engine load sensor for detecting engine load and generating an engine load signal; lock-up determination means which generates a lock-up signal or a lock-up release signal according to whether or not the operating condition of the engine represented by the rotational speed signal and the engine load signal is in a lock-up zone which is defined by first to third relations, the first relation being preset from a relation which the rotational speed and the engine load are to have with each other when the torque ratio of the engine output torque to the torque converter output torque is substantially 1, the second relation being preset from a relation which the rotational speed and the engine load are to have with each other when the engine output is substantially zero, and the third relation being preset from a lower limit of the rotational speed at which lock-up can be permitted, the lower limit being shifted toward the lower speed side of said rotational speed as the transmission gear mechanism is shifted toward the higher speed stage, and the third relation being changed corresponding to the change in the lower limit of said rotational speed; and control means which generates a control signal for controlling said lock-up driving means to engage or disengage said lock-up means according to the signal generated from, the lock-up determination means.

2. A torque converter lock-up control system as defined in claim 1 in which said third relation is changed toward the lower rotational speed side in proportion to the gear ratio.

3. A torque converter lock-up control system as defined in claim 2 in which said third relation is determined from the time interval required for the lock-up means to be disengaged and the time interval required for the operator to shift his foot from the accelerator to the brake pedal so that said rotational speed cannot be reduced to a value at which the engine will stall before the lock-up means is actually disengaged upon abrupt application of the brake.

4. A torque converter lock-up control system as defined in claim 1 in which said first to third relations are stored in a microcomputer.

5. A torque converter lock-up control system as defined in claim 1 in which said torque converter is of a hydrodynamic type wherein hydraulic fluid is circulated in operation, said lock-up means including a lock-up clutch which is adapted to be forced into engagement under the hydraulic fluid circulating in said torque converter and to be disengaged by a releasing hydraulic pressure applied thereto from outside.

6. A torque converter lock-up control system as defined in claim 1 in which said lock-up driving means includes solenoid valve means for controlling the releasing hydraulic pressure applied to the lock-up clutch.

7. A torque converter lock-up control system as defined in claim 1 in which said rotational speed sensor detects the rpm of the turbine of said torque converter as the rpm of the output shaft thereof.

8. A torque converter lock-up control system for an automatic transmission comprising a torque converter having input and output shafts, the input shaft being connected to an output shaft of an engine; a multiple stage transmission gear mechanism connected to the output shaft of the torque converter; a lock-up means adapted to be selectively engaged and disengaged to change the power transmission path between the input and output shafts of the torque converter, the lock-up means being adapted to directly connect the input and output shafts of the torque converter when engaged, an electromagnetic means for controlling supply of hydraulic pressure to said lock-up means to thereby govern engagement and disengagment of the lock-up means; a turbine rpm sensor which detects the rpm of the output shaft of the torque converter and generates a turbine rpm signal; an engine load sensor for detecting engine load and generating an engine load signal; lock-up determination means which generates a lock-up signal or a lock-up release signal according to whether or not the operating condition of the engine repersented by the turbine rpm signal and the engine load signal is in a lock-up zone which is defined by first to third lock-up control lines, the first lock-up control line being preset from a relation which the tubine rpm and the engine load are to have with each other when the torque ratio of the engine output torque to the torque converter output torque is substantially 1, the second lock-up control line being preset from a relation which the turbine rpm and the engine load are to have with each other when the engine output is substantially zero, and the third lock-up control being preset from a lower limit of the turbine rpm at which lock-up can be permitted, the lower limit being shifted toward the lower speed side of said rotational speed as the transmission gear mechanism is shifted toward the higher speed stage, the third lock-up control line being changed corresponding to the change in the lower limit of said turbine rpm; and control means for controlling said electromagnetic means to engage or disengage said lock-up means according to the signal generated from the lock-up determination means.

9. A torque converter lock-up control system as defined in claim 8 in which each of said first to third lock-up control lines comprises a lock-up line and a lock-up release line which are opposed to each other with hysteresis therebetween.

* * * * *